US010102632B2

(12) United States Patent
Ray (10) Patent No.: US 10,102,632 B2
(45) Date of Patent: Oct. 16, 2018

(54) LINE SEGMENT DETECTION IN LOW CONTRAST IMAGES

(71) Applicant: The Boeing Company, Chicago, IL (US)

(72) Inventor: Gary Alan Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 43 days.

(21) Appl. No.: 15/273,678

(22) Filed: Sep. 22, 2016

(65) Prior Publication Data

US 2018/0082425 A1    Mar. 22, 2018

(51) Int. Cl.
*G06K 9/34*    (2006.01)
*G06T 7/00*    (2017.01)

(52) U.S. Cl.
CPC .. *G06T 7/0085* (2013.01); *G06T 2207/10004* (2013.01)

(58) Field of Classification Search
CPC ...... G06K 9/4671; G06K 9/0061; G06T 7/13; G06T 7/246; G06T 2207/20224
See application file for complete search history.

(56) References Cited

U.S. PATENT DOCUMENTS

| 2011/0150279 | A1* | 6/2011 | Kotake | ................ G06K 9/4604 382/103 |
| 2012/0293663 | A1* | 11/2012 | Liu | ....................... G06T 7/0018 348/169 |

* cited by examiner

*Primary Examiner* — Eueng-Nan Yeh
(74) *Attorney, Agent, or Firm* — Yee & Associates, P.C.

(57) ABSTRACT

A method for detecting line segments in an image. The method includes receiving an image taken by a camera. The method also includes computing, using a processor, line segment array metrics for the image. The method also includes finding, using the processor, a first maximum metric from the line segment array metrics. The method also includes determining, using the processor, a first line segment for the first maximum metric, wherein a processed image is created.

20 Claims, 9 Drawing Sheets

```
% test. m
minlen=3
R=10;
C=12;
S=0.9;

L=zeros (R+2, C+2)
L(3,3)=1;
L(4,4)=1;
L(5,5)=1;
L(6,6)=1;
L(7,2)=1;
L(7,3)=1;
L(7,4)=1;
L(7,5)=1;
L(5,9)=1;
L(6,9)=1;
L(7,9)=1;
L(8,9)=1;
L(9,9)=1;
M=L+S*rand(R+2, C+2);
M=M/max (max(M));
  figure(1);
  imagesc(M); colorbar;
MM=zeros ((R+2)*(C+2), (R+2)*(C+2));
  for j1=2: R-1
    for k1=2:C-1
      for j2=(j1):R+1
        for k2=(k1):C+1
          if ((j2-j1)>=minlen || (k2-k1)>=minlen),
          n=max ((j2-j1), (k2-k1));
%         n=round (sqrt((j2-j1)^2+(k2-k1(^2));
          r=(linspace(j1,j2, n+1))
          c=(linspace(k1,k2, n+1));
          x=[-(k2-k1),(j2-j1)]
          x=x/n
          i1=round (r-x(1)+(c-x(2)-1)*(R+2));
          i2=round (r+(c-1)*(R+2));
          i3=round (r+x(1)+(c+x(2)-1)*(R+2));
%         consistent=max (std(M(i2)), eps);
          consistent=std(M(i2));
          different=abs (2*sum(M(i2))-sum(M(i1))-sum(M(i3)))/(n+1)
          metric=(n+1)*(S*different-consistent);
%         metric=(n+1)*(different/sqrt(consistent));
          MM(j1+(k1-1)*(R+2),j2+(k2-1)*(R+2))=metric;
          end
%         if 2==abs (2*sum(M(i2))-sum(M(i1))-sum(M(i3)))/(n+1),
%         if j1==3 && k1==3 &&j2==6 && k2==6,
%           keyboard
%         end
        end
      end
    end
  end
end
figure (2); mesh (MM);
v-find (MM==max(max(MM)))
[rr,cc]=ind2sub(size(MM), v(1));
[rr1.cc1]=ind2sub(size (M), rr)
[rr2.cc2]=ind2sub(size (M), cc)
n=max ((rr2-rr1),(cc2-cc1));
```

FIG. 6A

```
%n=round(sqrt((rr2-rr1)^2+(cc2-cc1)^2));
r=round(linspace(rr1,rr2, n+1));
x=[-(cc2-cc1),(rr2-rr1)]; x=x/n;
r=[r, round(linspace(rr1-x(1), rr2-x(1), n+1))];
r=[r, round(linspace(rr1+x(1),rr2+x(1), n+1))];
c=round(linspace(cc1,cc2,n+1));
c=[c,round(linspace(cc1-x(2), cc2-x(2), n+1))];
c=[c,round(linspace(cc1+x(2), cc2+x(2), n+1))];
ii=sub2ind(size(M),r,c);
%   this is everything that starts AND ends at current segment
%for j=1:length(ii)-1
%   for k=j+1:length (ii)
%       v=sub2ind(size(MM), ii(j), ii(k));
%       MM(v)=-inf;
%   end
%end
%   this is everything that starts OR ends at current segment
N=length(MM);
for j=1:N
    [rr,cc]=ind2sub(size(M),j);
    for k=1:length(r)
        x=[(r(k)-rr),(c(k)-cc)];
        n=max(abs(r(k)-rr),abs(c(k)-cc));
        x=x/n;
        vr=round(r(k)+x(1)*(0:(R+C)));
        vc=round(c(k)+x(2)*(0:(R+C)));
        ivr-(vr<=R & vr>=1); ivc=(vc<=C&vc>=1);
        ivr=ivr&ivc;
        vr=vr(ivr); vc=vc(ivr);
        vv=sub2ind(size(M), vr,vc);
        v=sub2ind(size(MM), j*ones(1, length(vv)),vv);
        MM(v)=-inf;
    end
end
figure(3); mesh(MM);
v=find(MM==max(max(MM)))
[rr,cc]=ind2sub(size(MM),v(1)));
[rr1,cc1]=ind2sub(size(M),rr);
[rr2,cc2]=ind2sub(size(M),cc);
n=max((rr2-rr1),(cc2-cc1));
%n=round(sqrt((rr2-rr1)^2+(cc2-cc1)^2));
r=round(linspace(rr1,rr2,n+1));
x=[-(cc2-cc1),(rr2-rr1)]; x=x/n;
r=[r, round(linspace(rr1-x(1), rr2-x(1), n+1))];
r=[r, round(linspace(rr1+x(1), rr2+x(1), n+1))];
c=round(linspace(cc1,cc2,n+1));
c=[c,round(linspace(cc1-x(2),cc2-x(2),n+1))];
c=[c,round(linspace(cc1+x(2),cc2+x(2),n+1))];
ii=sub2ind(size(M),r,c);
%   this is everything that starts OR ends at current segment
N=length(MM);
for j=1:N
    [rr,cc]=ind2sub(size(M),j);
    for k=1:length(r)
```

FIG. 6B

```
            x=[(r(k)-rr),(c(k)-cc)];
            m=max(abs(r(k)-rr),abs(c(k)-cc));
            x=x/n;
            vr=round(r(k)+x(1)*(0:(R+C)));
            vc=round(c(k)+x(2)*(0:(R+C)));
            ivr=(vr<=R & vr>=1); ivc=(vc<=C & vc>=1);
            ivr=ivr&ivc;
            vr=vr(ivr); vc=vc(ivr);
            vv=sub2ind(size(M), vr,vc);
            v=sub2ind(size(MM), j*ones(1, length(vv)),vv);
            MM(v)=-inf;
        end
end
figure (3); mesh(MM);
v=find(MM==max(max(MM)))
[rr,cc]=ind2sub(size(MM),v(1)));
[rr1,cc1]=ind2sub(size(M),rr);
[rr2,cc2]=ind2sub(size(M),cc);
```

LINE SEGMENT DETECTION IN LOW CONTRAST IMAGES

BACKGROUND INFORMATION

1. Field

This disclosure relates to line segment detection in low contrast images.

2. Background

Imaging systems come in many different modalities because they can use widely different methods of sensing. They could use synthetic aperture radar (SAR) methods, telescopes and visible imaging, infrared cameras, multispectral imaging, light detection and ranging (LADAR), acoustics, magnetic resonance imaging (MRI), and others. All these methods produce images (one, two and higher dimensional images) including pixel data which can be represented as a 1D, 2D, or multidimensional array of values. When the sensors are capable of video, a sequence of arrays of values results. One of the main problems is to find objects of interest in these images. These objects of interest are quite often defined by lines or edges that distinguish them from other objects in the images. However, the noise in these images can make detection of these objects of interest very difficult.

SUMMARY

An illustrative embodiment of the present disclosure provides for a method for detecting line segments in an image. The method includes receiving an image taken by a camera. The method also includes computing, using a processor, line segment array metrics for the image. The method also includes finding, using the processor, a first maximum metric from the line segment array metrics. The method also includes determining, using the processor, a first line segment for the first maximum metric, wherein a processed image is created.

The illustrative embodiments also provide for a computer. The computer includes a processor, a bus, and a memory connected to the bus. The memory stores computer usable program code which, when executed by the processor, performs a method for detecting line segments in an image. The computer usable program code includes computer usable program code for receiving an image taken by a camera. The computer usable program code also includes computer usable program code for computing, using a processor, line segment array metrics for the image. The computer usable program code also includes computer usable program code for finding, using the processor, a first maximum metric from the line segment array metrics. The computer usable program code also includes computer usable program code for determining, using the processor, a first line segment for the first maximum metric, wherein a processed image is created.

The illustrative embodiments also provide for a computer program product comprising a non-transitory computer recordable storage medium storing computer usable program code which, when executed by a processor, performs a method for detecting line segments in an image. The computer usable program code includes computer usable program code for receiving an image taken by a camera. The computer usable program code also includes computer usable program code for computing, using a processor, line segment array metrics for the image. The computer usable program code also includes computer usable program code for finding, using the processor, a first maximum metric from the line segment array metrics. The computer usable program code also includes computer usable program code for determining, using the processor, a first line segment for the first maximum metric, wherein a processed image is created.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6B is a continuation of an illustration of pseudo-code for implementing, using a processor, a method for line detection in an image, in accordance with an illustrative embodiment;

DETAILED DESCRIPTION

The illustrative embodiments may recognize and take into account one or more different considerations. For example, the illustrative embodiments recognize and take into account that existing solutions do not fully take into account the two characteristics of consistency and distinguishability when trying to find lines in an image. Thus existing solutions suffer from poorer performance in low contrast and noisy images.

Thus, the illustrative embodiments provide an efficient, high performance means to detect line segments in low contrast images. The illustrative embodiments have important applications in radar, sonar, visible and infrared imaging.

In particular, when forming images under different sensor modalities, it is often desirable that objects of interest are hidden in the noisy image but can in theory be detected by their artificial structure, which is often defined by line segments (since artificial or man-made structures have characteristics of being manufactured with simple geometry). These line segments stand in contrast to natural or noise which has complex shapes or no structure. In addition, lines can also form as characteristics of flaws (such as cracks) which also have a linear geometric structure.

Attention is now turned to additional information relevant to the illustrative embodiments. The illustrative embodiments further recognize and take into account that imaging systems come in many different modalities because they can use widely different methods of sensing. Imaging systems could use synthetic aperture radar (SAR) methods, telescopes and visible imaging, infrared cameras, multispectral imaging, LADAR, acoustics, MRI, etc. All these methods produce images (one, two and higher dimensional images) including pixel data which can be represented as a one-dimensional, two-dimensional, or multi-dimensional array of values.

When the sensors are capable of video, a sequence of arrays of values results. One of the main problems is to find objects of interest in these images. These objects are quite often defined by lines or edges that distinguish them from other objects in the images.

However, the noise in these images can make detection of these objects very difficult. Thus, the illustrative embodiments provide an efficient, high performance means to detect line segments in low contrast images. In particular, when forming images under different sensor modalities, it is often desirable that objects of interest are hidden in the noisy image but can in theory be detected by their artificial structure which is often defined by line segments (since artificial or man-made structures have characteristics of being manufactured with simple geometry), in contrast to natural or noise which has complex or no structure. In addition, lines can also form as characteristics of flaws (such as cracks) which also have a linear geometric structure.

There are many applications within each type of image modality. For visible images, detecting lines are a means of detecting artificial structures. Thus buildings have lines around their border as well as lines that outline windows and doors, etc. Also, lines are used to detect scratches in wiring and other electrical components. For infrared images, lines could bound things that are hotter or colder if they are artificial, also lines could be related to motion since a car can leave a temporary hot streak where it has traveled. For sonar images, lines could be related to underwater structures such as pipes or cables. For radar SAR images, lines could also related to road or building detection. In all these cases, a line detector is the basis of a feature detector for things that are artificial and have lines in their shapes.

Thus the line detector facilitates a pipe detector, cable detector, building detector, road detector, etc. While there are a number of line detectors in usage today, these are usually based on features which have a sharp corner (change in value of one pixel to its neighbor). These techniques do not work well when the line is barely visible in low contrast images. These are images like sonar images, SAR images and infrared images where the images often have a very low contrast (unlike daytime visible images which can have high contrast). However, even visible images can have low contrast under low light conditions, in fog, or in other obscuration conditions.

Thus, the illustrative embodiments provide for the combination of all the steps that use all three of the following in its metric: length, consistency, and distinguishability. No other algorithm is able to combine these features. In this manner, the illustrative embodiments provide for line segment detection in low contrast images.

In summary, the basic approach is to optimally use the three line segment characteristics of length, consistency, and distinguishability. Existing solutions do not fully take into account these characteristics when trying to find lines in an image. Thus, they suffer from poorer performance in low contrast and noisy images.

The illustrative embodiments recognize and take into account these disadvantages. Thus, the illustrative embodiments provide the ability to combine the consistency and distinguishability of line segment structures. The illustrative embodiments also provide for a parallelizable algorithmic implementation. The illustrative embodiments also provide for simple single parameter controls of the relative importance of length, consistency, and distinguishability. The illustrative embodiments do not necessarily require other parameters to tweak, but can exclude short line segments if desired. The illustrative embodiments also may extract line segments in order of the size of their line metric. As a result of these advantages, the illustrative embodiments provide benefits including faster processor speed, and better performance on both single and parallel computing machines relative to current algorithms.

Figure 1:
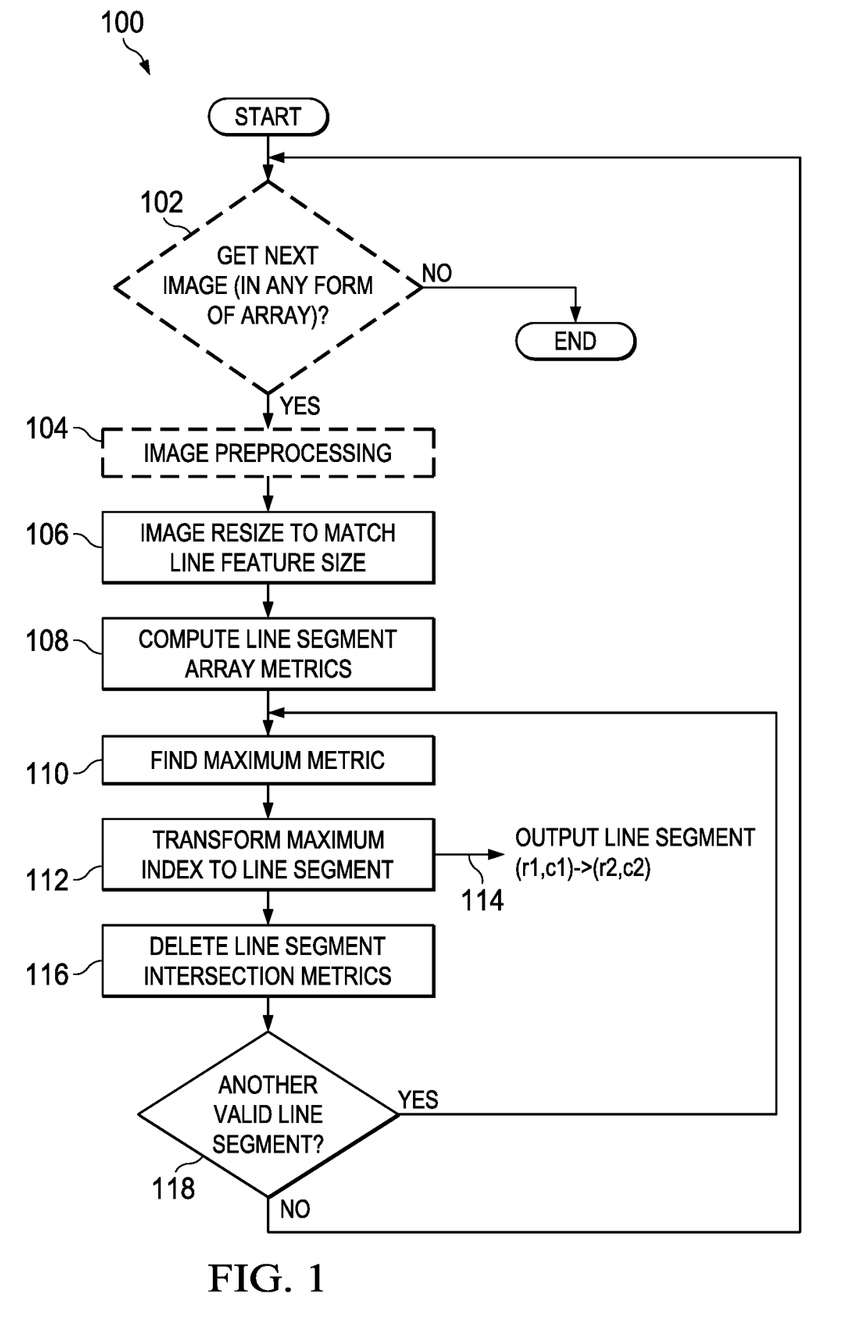
FIG. 1 is an illustration of a flowchart of a method for line detection in an image, in accordance with an illustrative embodiment.

FIG. 1 through FIG. 5 should be read together. Thus, the following description includes references to all five figures. An overview of FIG. 1 is presented first.

FIG. 1 is an illustration of a flowchart of a method for line detection in an image, in accordance with an illustrative embodiment. Method 100 may be characterized as a method for line detection in an image, or as a line detection architecture. Method 100 may be implemented using a data processing system, such as data processing system 900 of FIG. 9. Method 100 increases the speed of the processor of such a data processing system.

In an illustrative embodiment, method 100 begins with determining whether to get a next image in any form of an array (operation 102). If "yes," then method 100 then includes image processing (operation 104). Next, method 100 includes image resizing to match line feature size (operation 106). Method 100 then includes computing line segment array metrics (operation 108). Method 100 includes finding the maximum metric (operation 110) and transforming the maximum index to line segment (operation 112). Method 100 then includes outputting a line segment as (r1,c1)→(r2,c2) (operation 114). Method 100 then includes deleting line segment intersection metrics (operation 116).

A determination is then made whether another valid line segment exists (operation 118). If "yes," then method 100 returns to operation 110 and the process continues for the next valid line segment. If "no", then method 100 returns to operation 102 to get the next image. However, if at operation 102 no new image is to be retrieved (a "no" determination at operation 102), then method 100 may terminate thereafter.

Attention is now turned to additional detail regarding computing the line segment array metric. Lines in images typically have a maximum width in order to be called lines. Otherwise, they would be recognized as other types of features, such as rectangles, squares, etc.

Often this width is one pixel (at the limits of resolution of the imaging sensor). However, this situation is not necessarily the case. In order to accommodate different line widths, the image can be resized (via pixel interpolation or filtering) so that its new pixel width is equal to the minimal width of a line. This pre-processing step can also be done multiple times to detect lines of different widths.

Figure 4:
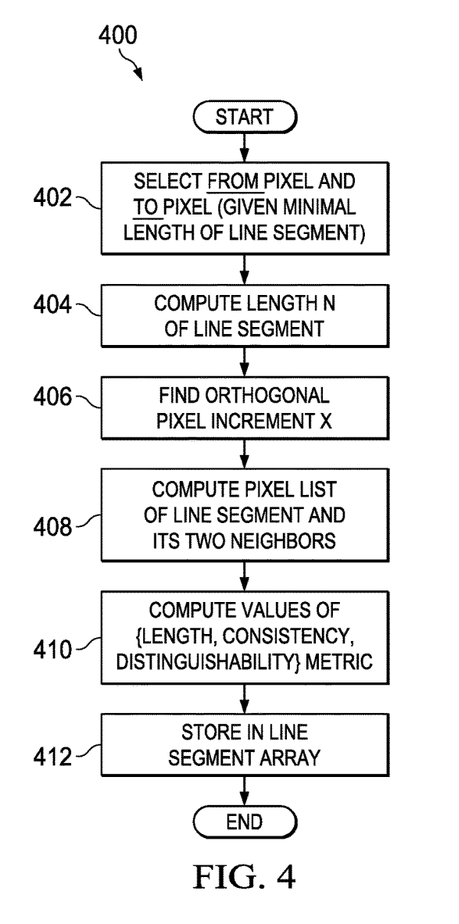
FIG. 4 is an illustration of flowchart of a method for computing line segment arrays, in accordance with an illustrative embodiment.
Figure 6A:
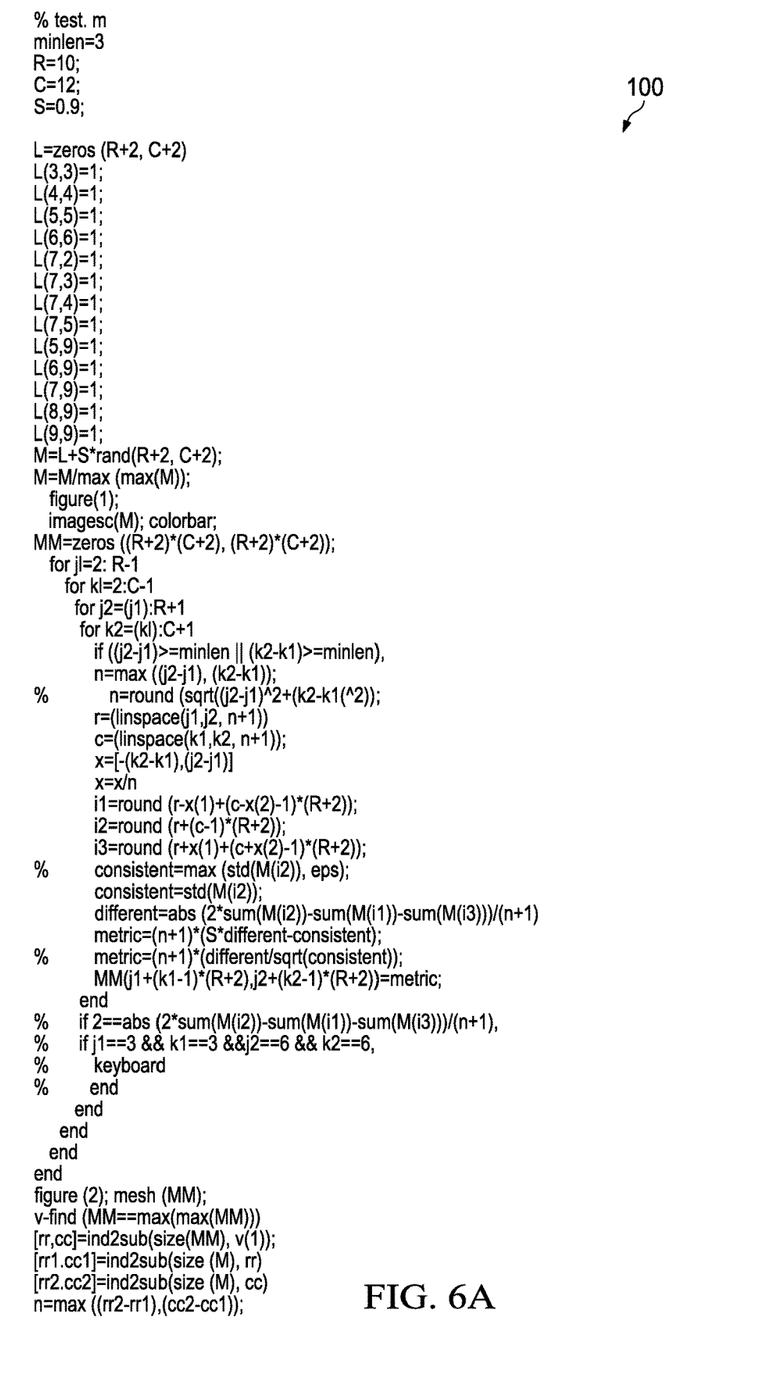
FIG. 6A is an illustration of pseudo-code for implementing, using a processor, a method for line detection in an image, in accordance with an illustrative embodiment.
Figure 6C:
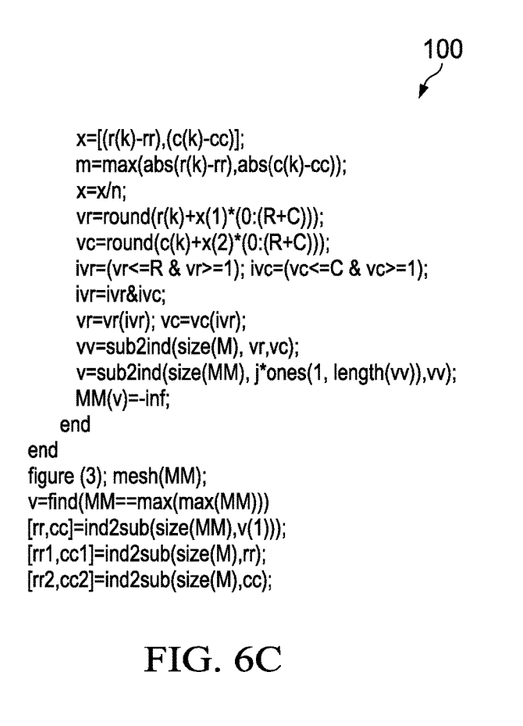
FIG. 6C is a continuation of an illustration of pseudo-code for implementing, using a processor, a method for line detection in an image, in accordance with an illustrative embodiment.

FIG. 4, described further below, shows the process to compute the line segment array metric. This process is the most computational part of this algorithm, using $O(R^2C^2)$ for images of size R×C: Note that this can be reduced if the image is sparse in terms of non-noise pixels. In this case, the algorithm uses $O(P^2)$ for images with P non-noise pixels. The Matlab code in FIG. 6A through FIG. 6C shows an implementation of this process for a sample image with three short line segments, segment 202, segment 204, and segment 206, seen in the example image in FIG. 2, below.

Figure 3:
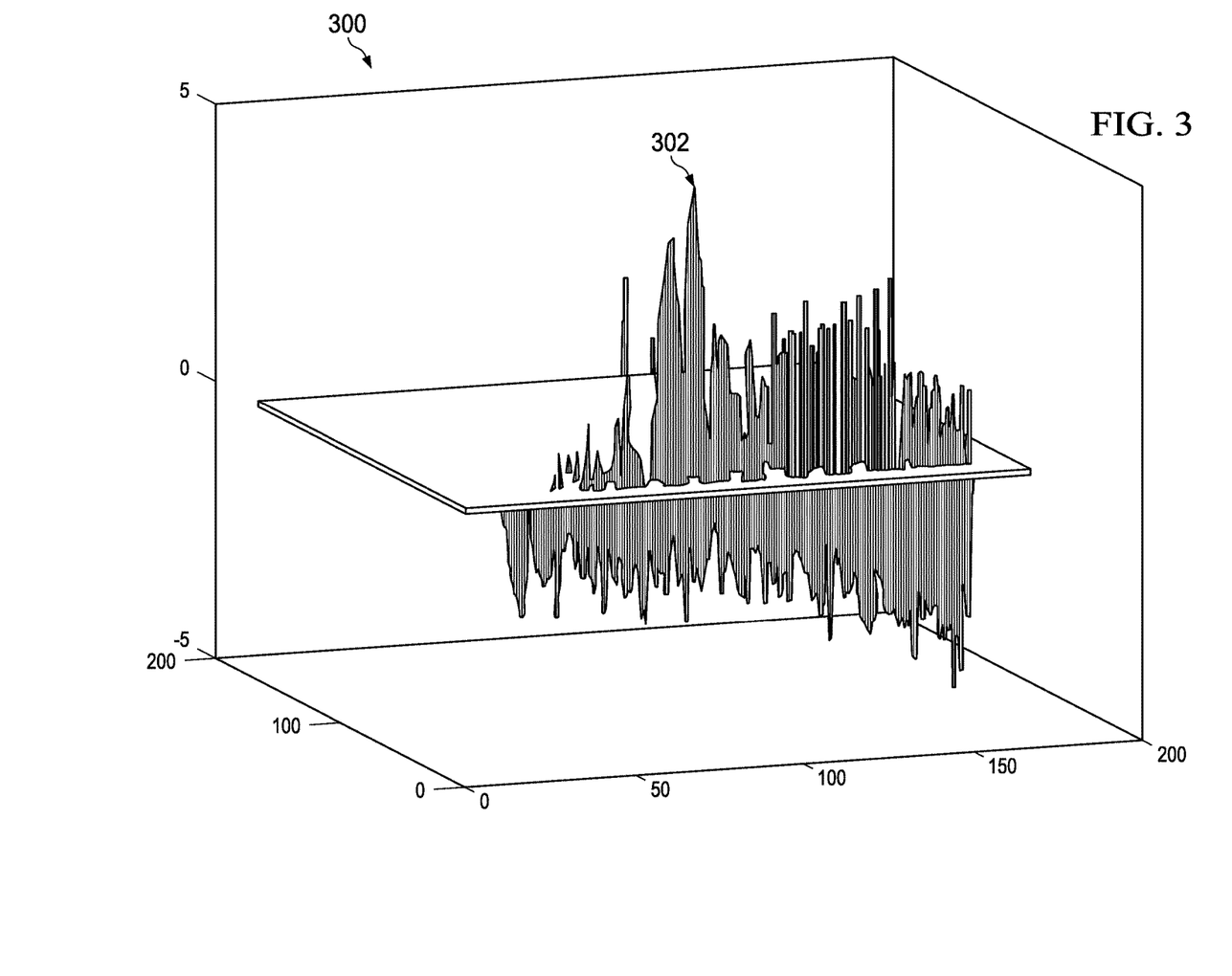
FIG. 3 is an illustration of an example line segment metric array for an example image, in accordance with an illustrative embodiment.

FIG. 3, below, shows first line segment metric table 300 in graph form. Highest peak 302 corresponds to the first line segment found. This process is based on a metric that is used in the test code shown in FIG. 6A through FIG. 6C. More complicated metrics can be used, especially for image modalities that require them or for specifics of line features that need to be captured in unique ways.

The metric described herein uses three elements: "n," the line segment length in pixels, "different", the sub-metric that measures the distinguishability of the line LS from its line neighbors on either side $LS^-$ and $LS^+$, and "consistent", a measure of how similar the line appears across its entire length.

Note that the algorithm described herein is for lines specifically, rather than edges; however, the algorithm could be changed to be for edges. All that would be required is to only consider neighbors on one side of the line rather than both. Note also that the algorithm can be easily modified to process lines of any particular width as well; they do not have to be one pixel wide. This modification can be done either by using different pixel widths when processing lines and their neighbors, but can also be done by resizing the image through proper filtering.

The "different" metric is computed via the following equation:

$$\text{different} = \left| 2 \sum_{\text{pixels } p \in LS} I(p) - \sum_{\text{pixels } p \in LS^-} I(p) - \sum_{\text{pixels } p \in LS^+} I(p) \right| / (n+1),$$

Where n is the maximum pixel difference in either row or column between one endpoint of the line LS and the other. Here I(p) is a function which measure the intensity of the pixel. This value is chosen to match the problem at hand. For example, if one is looking for red lines, I(p) would return the red intensity of the pixel. If one were only concerned with brightness, I(p) would measure brightness, etc.

The "consistent" metric is defined by the equation:

$$\text{consistent} = \text{std}_{\text{pixels } p \in LS} \{I(p)\},$$

Where "std" denotes the standard deviation computed on the set of pixels on the potential line segment.

The final metric, "linemetric", which uses the length, distinguishability, and consistency concepts is then defined as the equation:

$$\text{linemetric} = (n+1)(S^* \text{different} - \text{consistent}).$$

Here, S is an adjustable parameter to modify the relative importance of distinguishing the line from its surroundings versus being consistent in intensity (for example color) along the line. The value of S is chosen for the specific application and image environment to allow the metric to work as well as possible. The value of S is dependent on feature characteristics, image contrast, pixel noise, lighting conditions, and many other factors. A way to set the value of S would be to use sample images of a representative scenario and adjust S until its value gives the desired application specific behavior.

Attention is now turned to finding the maximum metric and output line segment. After the metrics are computed over an entire image, the maximum metric is found. This operation is of complexity $O(RC \log_2(RC))$ since it is determined by a $O(m^*\log_2 m)$ sort operation of the line segment metrics, where m is a generic variable. The index where the maximum is found corresponds to a particular ("From$_{pixel}$", "To$_{pixel}$") pair that defines a line segment. This information is output as a line segment detection that determines the application-specific results. For example, the results could be objects such as man-made objects and structures, windows, doors, scratches, or other things, such as heat motion.

Figure 5:
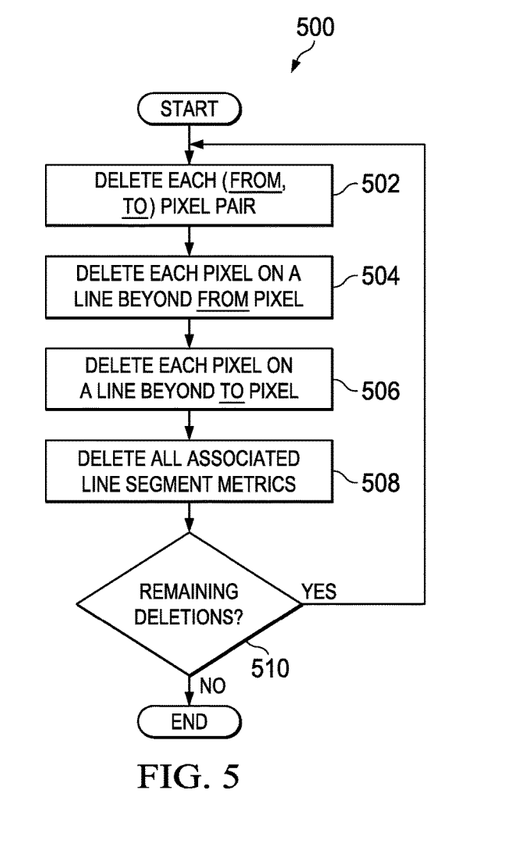
FIG. 5 is an illustration of flowchart of a method for deleting line segment metrics, in accordance with an illustrative embodiment.

Attention is now turned to deleting line segment intersections after line segment output. After a line segment is output, other potential line segments extending in both directions on the same mathematical line should be deleted from the line segment metric array. Deletion should take place because the other potential line segments have already been dropped in favor of the line segment that was chosen. FIG. 5, below, shows the process to delete all associated line segment metrics after the output of each particular line segment. The computational complexity of this operation is $O(R^2C^2)$.

In summary, we have presented a methodology to provide an efficient, high performance means to detect line segments in low contrast images. The illustrative embodiments have the following features. The illustrative embodiments have the ability to combine length, consistency, and distinguishability of line segment structures. The illustrative embodiments have a parallelizable algorithmic implementation. The illustrative embodiments have simple parameter controls of the relative importance of length, consistency, and distinguishability. The algorithm has no other parameters to tweak, but can exclude short line segments if desired. The illustrative embodiments provide an algorithm that extracts line segments in order of the size of their line metric. These features provide benefits over known techniques, including better performance in detection of lines in low contrast images or images with highly cluttered backgrounds. These features also cause the processor to operate faster when processing images.

Figure 2:
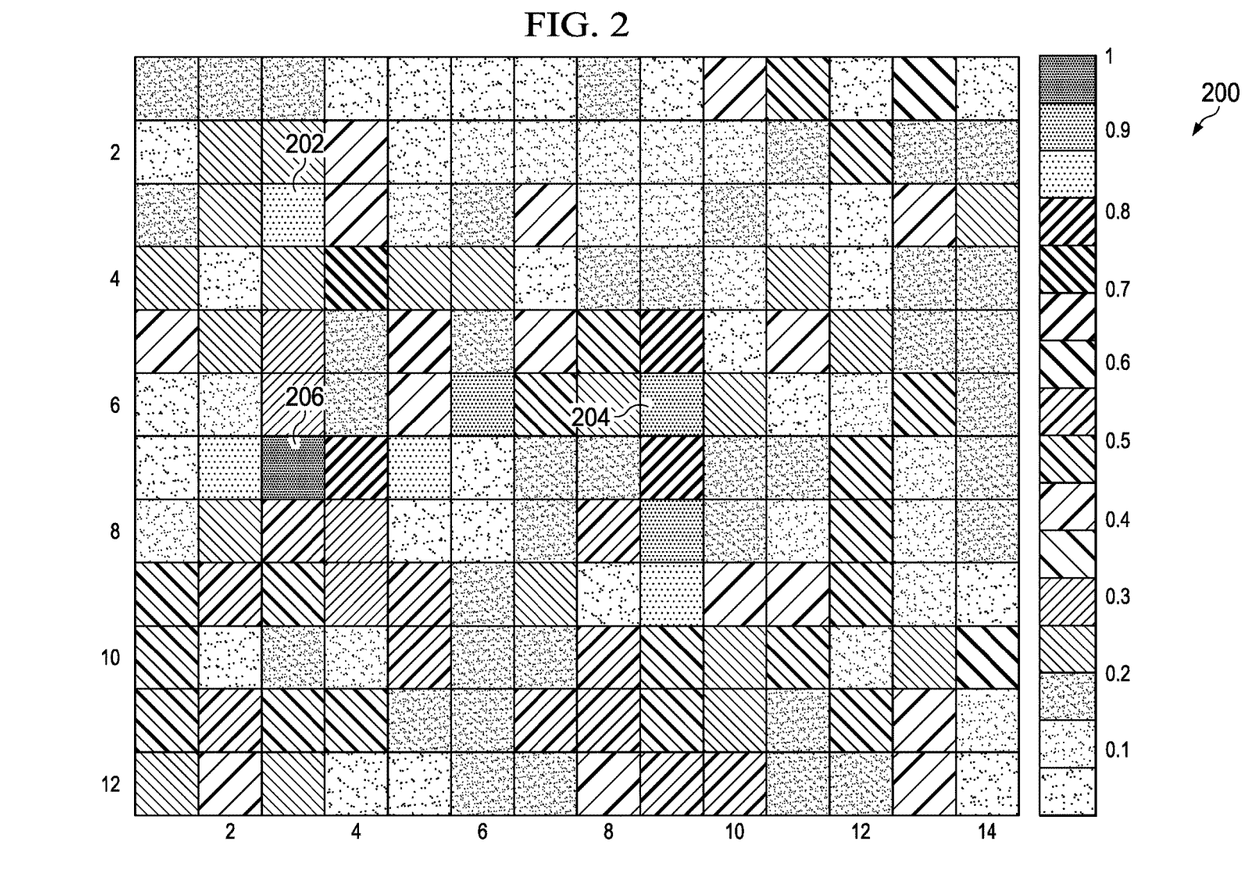
FIG. 2 is an illustration of an example image processed by code to find three line segments, in accordance with an illustrative embodiment.

FIG. 2 is an illustration of an example image processed by code to find three line segments, in accordance with an illustrative embodiment. Image 200 includes three short line segments, segment 202, segment 204, and segment 206. Image 200 may have been taken by a camera or other image generator. Image 200 is an example of a low contrast, low resolution image. The line segments shown in image 200 are highlighted for purposes of clarity in this document, though in actual practice the line segments may not be as apparent in the image. Image 200 may be processed by method 100 of FIG. 1 according to the pseudo code provided in FIG. 6A through FIG. 6C.

FIG. 3 is an illustration of an example of a line segment metric array for an example image, in accordance with an illustrative embodiment. FIG. 3 shows first line segment metric table 300 in graph form. Highest peak 302 corresponds to the first line segment found, say for example segment 202 from image 200 of FIG. 2. This process of finding the highest peak is based on a metric that is used in the test code shown in FIG. 6A through FIG. 6C. More complicated metrics can be used, especially for image modalities that require them or for specifics of line features that need to be captured in unique ways.

FIG. 4 is an illustration of flowchart of a method for computing line segment array metrics, in accordance with an illustrative embodiment. Specifically, FIG. 4 is an example of sub-operations that may be implemented by a processor to accomplish operation 108 of FIG. 1.

Method 400 is the most computational part of this algorithm, using $O(R^2C^2)$ for images of size R×C: Note that this can be reduced if the image is sparse in terms of non-noise pixels. In this case, the algorithm uses $O(P^2)$ for images with P non-noise pixels. The Matlab code in FIG. 6A through FIG. 6C shows an implementation of this process for a sample image with three short line segments, segment 202, segment 204, and segment 206, seen in image 200 of FIG. 2, above.

In an illustrative embodiment, method 400 begins by selecting a "from" pixel and a "to" pixel, given a minimal length of a line segment (operation 402). Method 400 then computes a length "n" of the line segment (operation 404). Method 400 then finds an orthogonal pixel increment "x" (operation 406). The orthogonal increment is the pixel offset from the current line pixel to pixels on either side of the line. For example, a horizontal line (in x direction) would have offsets of (0, +−1), a vertical line would have offsets (+−1, 0).

Method 400 then includes computing a pixel list of the line segment and its two neighbors (operation 408). The neighbors of the line segment are line segments on either side of the given line segment. It is formed by incrementing each pixel of the given line segment by the aforementioned orthogonal offsets. Method 400 then computes the values of the {length, consistency, distinguishability} metric (operation 410). Method 400 then includes storing a result of operation 410 in a line segment array (operation 412). The method may terminate thereafter. Alternatively, the method continues with operation 110 of FIG. 1.

FIG. 5 is an illustration of flowchart of a method for deleting line segment metrics, in accordance with an illustrative embodiment. FIG. 5 shows the process to delete all associated line segment metrics after the output of each particular line segment. The computational complexity of this operation is $O(R^2C^2)$. Specifically, FIG. 5 shows sub-operations that may be implemented by a processor to accomplish operation 116 of FIG. 1.

Method 500 may begin by deleting each ("From", "To") pixel pair (operation 502). Next, method 500 includes deleting each pixel on a line beyond the "From" pixel (operation 504). Next, method 500 includes deleting each pixel on a line beyond the "To" pixel (operation 506). Next, method 500 includes deleting all associated line segment metrics (operation 508). These operations do not necessarily have to be performed in this particular order; the order could be varied or could be performed in parallel.

After performing these deletions, method 500 includes determining whether remaining deletions should be performed (operation 510). If "yes", then method 500 returns to operation 502, but could return to any of operation 504, operation 506, or operation 508 if appropriate. If "no", then method 500 may terminate. Alternatively, method 500 may continue with operation 118 of FIG. 1.

FIG. 6A, FIG. 6B, and FIG. 6C are all, taken together, an illustration of pseudo-code for implementing, using a processor, a method for line detection in an image, in accordance with an illustrative embodiment. This method may be, for example, method 100 of FIG. 1 operating on image 200 of FIG. 2 producing at least first line segment metric table 300 of FIG. 3. The pseudo-code shown in these figures is exemplary only. This code may be reduced, expanded, or otherwise modified for any particular implementation of the illustrative embodiments.

Figure 7:
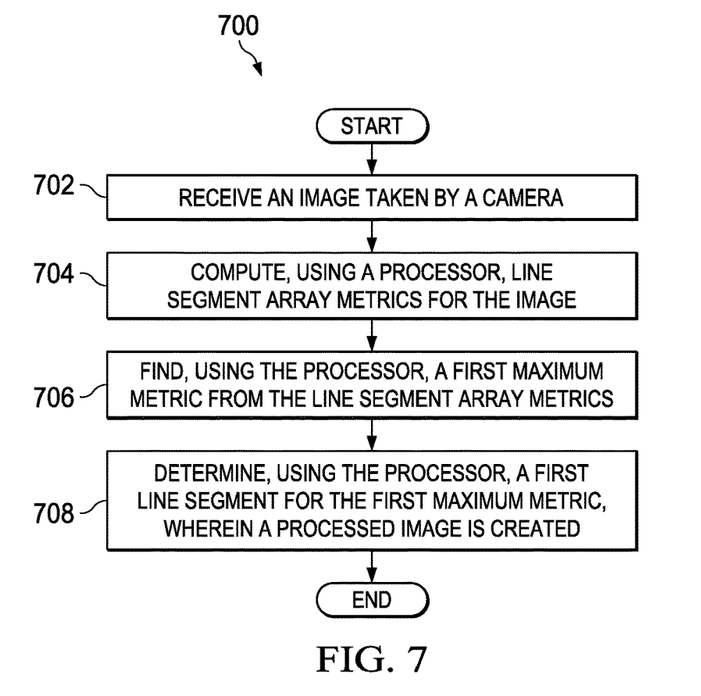
FIG. 7 is an illustration of a flowchart of a method for line detection in an image, in accordance with an illustrative embodiment.

FIG. 7 is an illustration of a flowchart of a method for line detection in an image, in accordance with an illustrative embodiment. Method 700 may be an alternative to method 100 of FIG. 1. Method 700 may be implemented using a data processing system, such as data processing system 900 of FIG. 9, and may also be used in conjunction with cameras for taking the image processed by method 700. Method 700 may be characterized as a method for detecting line segments in an image.

Method 700 includes receiving an image taken by a camera (operation 702). Method 700 also includes computing, using a processor, line segment array metrics for the image (operation 704). Method 700 also includes finding, using the processor, a first maximum metric from the line segment array metrics (operation 706). Method 700 also includes determining, using the processor, a first line segment for the first maximum metric, wherein a processed image is created (operation 708).

Method 700 may be further varied. For example, method 700 may further include determining, by the processor, that a second line segment is to be calculated; after determining the first line segment, deleting all line segment intersections from the processed image; after deleting all line segment intersections, computing a second maximum metric from the line segment array metrics; and computing a second line segment for the second maximum metric, wherein a second processed image is created. This method may be further expanded in that deleting all line segment intersections includes, for each 'from pixel' on a current line segment and all neighbor line segments, extending a corresponding line segment; and deleting all intersecting line segment metrics for the corresponding line segment.

Method 700 may further include, prior to computing line segment array metrics, performing image preprocessing. In this case, method 700 may still further include after performing image preprocessing and prior to computing line segment array metrics, resizing the image to match line feature sizes.

In another illustrative embodiment, computing the line segment array metrics includes selecting a 'from pixel' and a 'to pixel' in the image; computing a length 'n' of a line segment between the 'from pixel' and the 'to pixel'; finding an orthogonal pixel increment 'x' for the line segment; computing a pixel list of the line segment and two neighbor line segments in the image; computing a length metric, a consistency metric, and a distinguishability metric for the line segment; and storing the length metric, the consistency metric, and the distinguishability metric in an array, the array comprising the line segment array.

Method 700 may also include repeating computing, finding, and determining for all line segments in the image that are above a threshold length. For method 700, repeating may be performed in order of a size of the line segments.

Thus, method 700 may be varied and have more, fewer, or different operations. Accordingly, the illustrative embodiments described with respect to FIG. 7 do not necessarily limit the claimed inventions.

Figure 8:
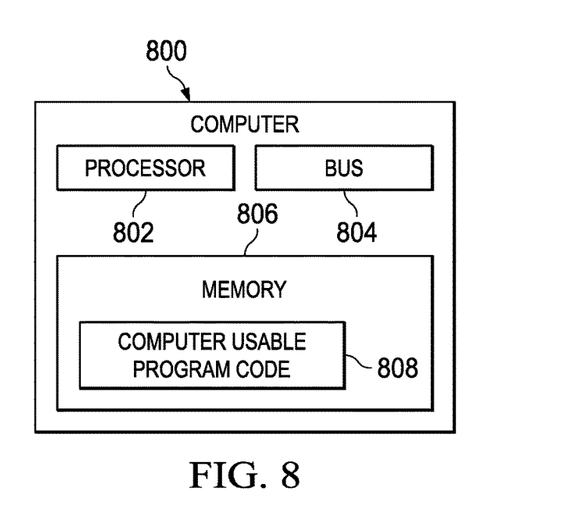
FIG. 8 is an illustration of a block diagram of a computer configured to implement a method for line detection in an image, in accordance with an illustrative embodiment.

FIG. 8 is an illustration of a block diagram of a computer configured to implement a method for line detection in an image, in accordance with an illustrative embodiment. Computer 800 may be an example of a data processing system, such as data processing system 900 of FIG. 9. Computer 800 may be used to implement methods such as method 100 of FIG. 1, method 400 of FIG. 4, method 500 of FIG. 5, and method 700 of FIG. 7.

Computer 800 may include processor 802, bus 804, and memory 806. Memory 806 may store computer usable program code 808 which, when executed by the processor, performs a method for detecting line segments in an image. Computer usable program code 808 includes computer usable program code for receiving an image taken by a camera. Computer usable program code 808 also includes computer usable program code for computing, using a processor, line segment array metrics for the image. Computer usable program code 808 also includes computer usable program code for finding, using the processor, a first maximum metric from the line segment array metrics. Computer usable program code 808 also includes computer usable program code for determining, using the processor, a first line segment for the first maximum metric, wherein a processed image is created. Computer usable program code 808 directly increases the speed of computer 800 by more efficiently processing images taken by the cameras.

Computer 800 may be further varied. For example, computer usable program code 808 may also include computer usable program code for determining, by the processor, that a second line segment is to be calculated. Computer usable program code 808 may also include computer usable program code for after determining the first line segment, deleting all line segment intersections from the processed image. Computer usable program code 808 may also include computer usable program code for, after deleting all line segment intersections, computing a second maximum metric from the line segment array metrics. Computer usable program code 808 may also include computer usable program code for computing a second line segment for the second maximum metric, wherein a second processed image is created.

In another illustrative embodiment, the computer usable program code for deleting all line segment intersections may be computer usable program code for, for each 'from pixel' on a current line segment and all neighbor line segments, extending a corresponding line segment; and computer usable program code for deleting all intersecting line segment metrics for the corresponding line segment. In still another illustrative embodiment, computer usable program code 808 further includes computer usable program code for, prior to computing line segment array metrics, performing image preprocessing.

In yet another illustrative embodiment, computer usable program code 808 further includes computer usable program code for, after performing image preprocessing and prior to computing line segment array metrics, resizing the image to match line feature sizes. In still another illustrative embodiment, the computer usable program code for computing the line segment array metrics includes: computer usable program code for selecting a 'from pixel' and a 'to pixel' in the image; computer usable program code for computing a length 'n' of a line segment between the 'from pixel' and the 'to pixel'; computer usable program code for finding an orthogonal pixel increment 'x' for the line segment; computer usable program code for computing a pixel list of the line segment and two neighbor line segments in the image; computer usable program code for computing a length metric, a consistency metric, and a distinguishability metric for the line segment; and computer usable program code for storing the length metric, the consistency metric, and the distinguishability metric in an array, the array comprising the line segment array.

In still another illustrative embodiment, computer usable program code 808 may include computer usable program code for repeating computing, finding, and determining for all line segments in the image that are above a threshold length. In yet another illustrative embodiment, the computer usable program code for repeating may be configured to perform in order of a size of the line segments.

Thus, computer 800 may be varied and have more, fewer, or different components. Accordingly, the illustrative embodiments described with respect to FIG. 8 do not necessarily limit the claimed inventions.

Figure 9:
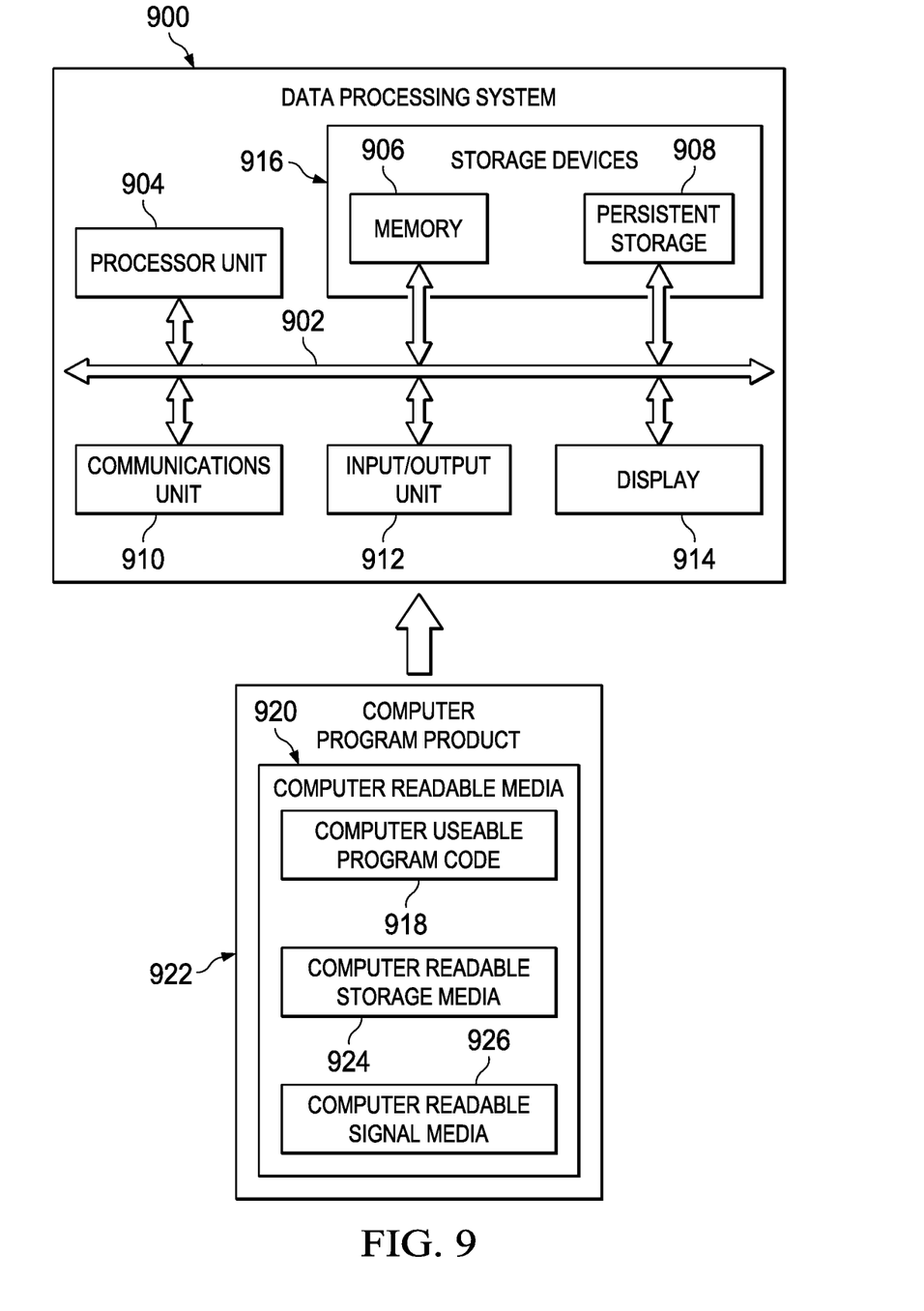
FIG. 9 is an illustration of a data processing system, in accordance with an illustrative embodiment.

Turning now to FIG. 9, an illustration of a data processing system is depicted in accordance with an illustrative embodiment. Data processing system 900 in FIG. 9 is an example of a data processing system that may be used to implement the illustrative embodiments, those described with respect to FIG. 1 through FIG. 8, or any other module or system or process disclosed herein. In this illustrative example, data processing system 900 includes communications fabric 902, which provides communications between processor unit 904, memory 906, persistent storage 908, communications unit 910, input/output (I/O) unit 912, and display 914.

Processor unit 904 serves to execute instructions for software that may be loaded into memory 906. This software may be any of the computer usable program code described elsewhere herein. Thus, for example, software loaded into memory 906 may be the various forms of computer usable program code described with respect to computer 800 of FIG. 8. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output (I/O) unit 912 allows for input and output of data with other devices that may be connected to data processing system 900. For example, input/output (I/O) unit 912 may provide a connection for user input through a keyboard, a mouse, and/or some other suitable input device. Further, input/output (I/O) unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Computer useable program code 918 is located in a functional form on computer readable media 920 that is selectively removable and may be loaded onto or transferred to data processing system 900 for execution by processor unit 904. Computer useable program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

Alternatively, computer useable program code 918 may be transferred to data processing system 900 using computer readable signal media 926. Computer readable signal media 926 may be, for example, a propagated data signal containing computer useable program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, computer useable program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing computer useable program code 918 may be a server computer, a client computer, or some other device capable of storing and transmitting computer useable program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, computer useable program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run computer useable program code 918. With this depicted example, some of the processes may be implemented in the number of hardware units, while other processes may be implemented in the number of processors.

As another example, a storage device in data processing system 900 is any hardware apparatus that may store data. Memory 906, persistent storage 908, and computer readable media 920 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906, or a cache, such as found in an interface and memory controller hub that may be present in communications fabric 902.

Data processing system 900 may also an include associative memory. The associative memory may be in communication with communications fabric 902. The associative memory may also be in communication with, or in some illustrative embodiments, be considered part of storage devices 916. Additional associative memories may be present.

As used herein, the term "associative memory" refers to a content addressable memory. An associative memory may be considered a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on at least indirect relationships, as well as based on combinations of direct and at least indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and at least indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for detecting line segments in images, the method comprising:
   receiving an image taken by a camera;
   computing, using a processor, line segment array metrics for the image using a first equation, $$\text{linemetric} = (n+1)(S * \text{different} - \text{consistent}),$$

wherein "S" is an adjustable parameter used to distinguish a line from its surroundings, "n" in the first equation is a line segment length, "different" is a distinguishability metric that measures a distinguishability of the line from at least line neighbors and is computed using a second equation, $$\text{different} = \left| 2 \sum_{pixels p \in LS} I(p) - \sum_{pixels p \in LS^-} I(p) - \sum_{pixels p \in LS^+} I(p) \right| / (n+1)$$

wherein "n" in the second equation is a maximum pixel difference and I(p) is a function which measures an intensity of a pixel;

wherein "consistent" in the first equation is a consistency metric and is computed using a third equation, $$\text{consistent} = \text{std}_{pixels\ p \in LS}\{I(p)\},$$

wherein "std" denotes a standard deviation computed on a set of pixels on a potential line segment and "LS" is a line segment, finding, using the processor, a first maximum metric from the line segment array metrics; and determining, using the processor, a first line segment for the first maximum metric, wherein as a result of receiving, determining, computing, and finding, a processed image is created.

2. The method of claim 1 further comprising:
determining, by the processor, that a second line segment is to be computed, wherein the second line segment is also from the image;
after determining the first line segment, deleting all line segment intersections from the processed image;
after deleting all line segment intersections, computing a second maximum metric from the line segment array metrics; and
computing the second line segment for the second maximum metric, wherein a second processed image is created.

3. The method of claim 2, wherein deleting all line segment intersections comprises:
for each 'from pixel' on a current line segment and all neighbor line segments, extending a corresponding line segment; and
deleting all intersecting line segment metrics for the corresponding line segment.

4. The method of claim 1 further comprising:
prior to computing line segment array metrics, performing image preprocessing.

5. The method of claim 4 further comprising:
after performing image preprocessing and prior to computing line segment array metrics, resizing the image via pixel interpolation or filtering so that the image has a new pixel width equal to a minimal line width.

6. The method of claim 1, wherein computing the line segment array metrics comprises:
selecting a 'from pixel' and a 'to pixel' in the image;
computing the line segment length between the 'from pixel' and the 'to pixel';
finding an orthogonal pixel increment 'x' for the line segment;
computing a length metric for the line segment; and
storing the length metric, the consistency metric, and the distinguishability metric in an array, the array comprising the line segment array.

7. The method of claim 1 further comprising:
repeating computing, finding, and determining for all line segments in the image that are above a threshold length.

8. The method of claim 7, wherein repeating is performed in order of a size of the line segments.

9. A computer comprising:
a processor;
a bus; and
a memory connected to the bus, the memory storing computer usable program code which, when executed by the processor, performs a method for detecting line segments in images, the computer usable program code comprising:
computer usable program code for receiving an image taken by a camera;
computer usable program code for computing, using the processor, line segment array metrics for the image using a first equation, linemetric=$(n+1)(S^*\text{different}-\text{consistent})$, wherein "S" is an adjustable parameter used to distinguish a line from its surroundings, "n" in the first equation is a line segment length, "different" is a distinguishability metric that measures a distinguishability of the line from at least line neighbors and is computed using a second equation, $$\text{different} = \left| 2 \sum_{pixels p \in LS} I(p) - \sum_{pixels p \in LS^-} I(p) - \sum_{pixels p \in LS^+} I(p) \right| / (n+1)$$

wherein "n" in the second equation is a maximum pixel difference and I(p) is a function which measures an intensity of a pixel;

wherein "consistent" in the first equation is a consistency metric and is computed using a third equation, $$\text{consistent} = \text{std}_{pixels\ p \in LS}\{I(p)\},$$

wherein "std" denotes a standard deviation computed on a set of pixels on a potential line segment and "LS" is a line segment;

computer usable program code for finding, using the processor, a first maximum metric from the line segment array metrics; and computer usable program code for determining, using the processor, a first line segment for the first maximum metric, wherein, as a result of the computer executing the computer usable program code, a processed image is created.

10. The computer of claim 9, wherein the computer usable program code further comprises:
computer usable program code for determining, by the processor, that a second line segment is to be computed, wherein the second line segment is also from the image;
computer usable program code for, after determining the first line segment, deleting all line segment intersections from the processed image;
computer usable program code for, after deleting all line segment intersections, computing a second maximum metric from the line segment array metrics; and
computer usable program code for computing the second line segment for the second maximum metric, wherein a second processed image is created.

11. The computer of claim 10, wherein the computer usable program code for deleting all line segment intersections comprises:
computer usable program code for, for each 'from pixel' on a current line segment and all neighbor line segments, extending a corresponding line segment; and
computer usable program code for deleting all intersecting line segment metrics for the corresponding line segment.

12. The computer of claim 9, wherein the computer usable program code further comprises:
  computer usable program code for, prior to computing line segment array metrics, performing image preprocessing.

13. The computer of claim 9, wherein the computer usable program code further comprises:
  computer usable program code for, after performing image preprocessing and prior to computing line segment array metrics, resizing the image via pixel interpolation or filtering so that the image has a new pixel width equal to a minimal line width.

14. The computer of claim 9, wherein the computer usable program code for computing the line segment array metrics comprises:
  computer usable program code for selecting a 'from pixel' and a 'to pixel' in the image;
  computer usable program code for computing the line segment length between the 'from pixel' and the 'to pixel';
  computer usable program code for finding an orthogonal pixel increment 'x' for the line segment; and
  computer usable program code for computing a length metric for the line segment; and
  computer usable program code for storing the length metric, the consistency metric, and the distinguishability metric in an array, the array comprising the line segment array.

15. The computer of claim 9, wherein the computer usable program code further comprises:
  computer usable program code for repeating computing, finding, and determining for all line segments in the image that are above a threshold length.

16. The computer of claim 15, wherein the computer usable program code for repeating is configured to perform in order of a size of the line segments.

17. A computer program product comprising a non-transitory computer recordable storage medium storing computer usable program code which, when executed by a processor, performs a method for detecting line segments in images, the computer usable program code comprising:
  computer usable program code for receiving an image taken by a camera;
  computer usable program code for computing, using the processor, line segment array metrics for the image using a first equation, linemetric=$(n+1)(S^*\text{different}-\text{consistent})$, wherein "S" is an adjustable parameter used to distinguish a line from its surroundings, "n" in the first equation is a line segment length, "different" is a distinguishability metric that measures a distinguishability of the line from at least line neighbors and is computed using a second equation, $$\text{different} = \left| 2 \sum_{pixels\, p \in LS} I(p) - \sum_{pixels\, p \in LS^-} I(p) - \sum_{pixels\, p \in LS^+} I(p) \right| / (n+1)$$

wherein "n" in the second equation is a maximum pixel difference and I($p$) is a function which measures an intensity of a pixel;
  wherein "consistent" in the first equation is a consistency metric and is computed using a third equation, consistent=$\text{std}_{pixels\, p \in LS}\{I(p)\}$, wherein "std" denotes a standard deviation computed on a set of pixels on a potential line segment and "LS" is a line segment;
  computer usable program code for finding, using the processor, a first maximum metric from the line segment array metrics; and
  computer usable program code for determining, using the processor, a first line segment for the first maximum metric, wherein, as a result of the computer usable program code being executed, a processed image is created.

18. The computer program product of claim 17, wherein the computer usable program code further comprises:
  computer usable program code for determining, by the processor, that a second line segment is to be computed, wherein the second line segment is also from the image;
  computer usable program code for, after determining the first line segment, deleting all line segment intersections from the processed image;
  computer usable program code for, after deleting all line segment intersections, computing a second maximum metric from the line segment array metrics; and
  computer usable program code for computing a second line segment for the second maximum metric, wherein a second processed image is created.

19. The computer program product of claim 18, wherein the computer usable program code for deleting all line segment intersections comprises:
  computer usable program code for, for each 'from pixel' on a current line segment and all neighbor line segments, extending a corresponding line segment; and
  computer usable program code for deleting all intersecting line segment metrics for the corresponding line segment.

20. The computer program product of claim 17, wherein the computer usable program code further comprises:
  computer usable program code for, prior to computing line segment array metrics, performing image preprocessing; and
  computer usable program code for, after performing image preprocessing and prior to computing line segment array metrics, resizing the image via pixel interpolation or filtering so that the image has a new pixel width equal to a minimal line width.

* * * * *

UNITED STATES PATENT AND TRADEMARK OFFICE
CERTIFICATE OF CORRECTION

PATENT NO.         : 10,102,632 B2                                      Page 1 of 1
APPLICATION NO.    : 15/273678
DATED              : October 16, 2018
INVENTOR(S)        : Ray It is certified that error appears in the above-identified patent and that said Letters Patent is hereby corrected as shown below:

In the Claims

Claim 18: Paragraph 5, following "for computing" and preceding "second line segment" herein change "a second line segment" to read as "the second line segment"

Signed and Sealed this
Second Day of April, 2019

Andrei Iancu
*Director of the United States Patent and Trademark Office*